Nov. 21, 1967      CLEM TE BOW      3,353,771
UNIVERSAL ENGINE MOUNT AND METHOD OF MOUNTING ENGINE
Filed Dec. 30, 1965
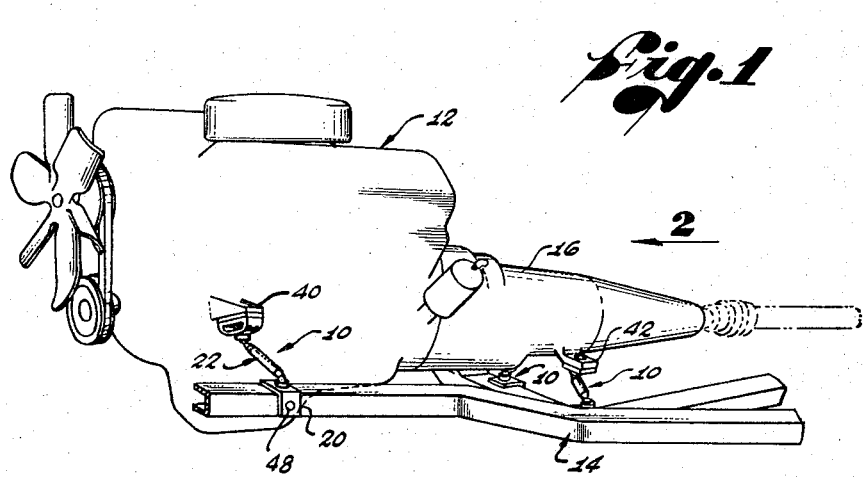
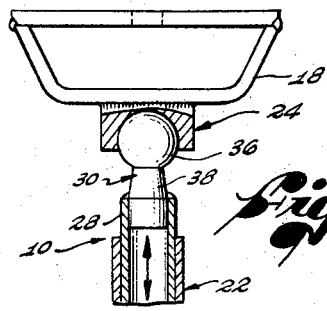
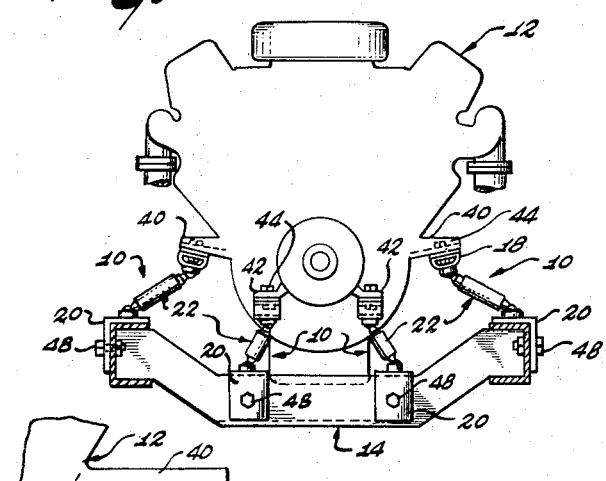
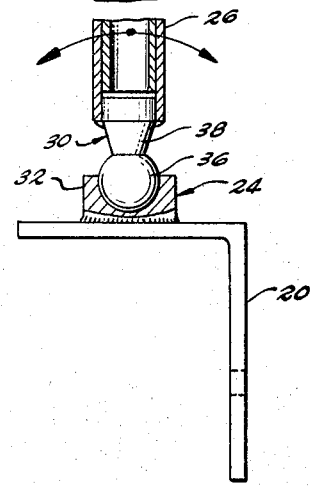
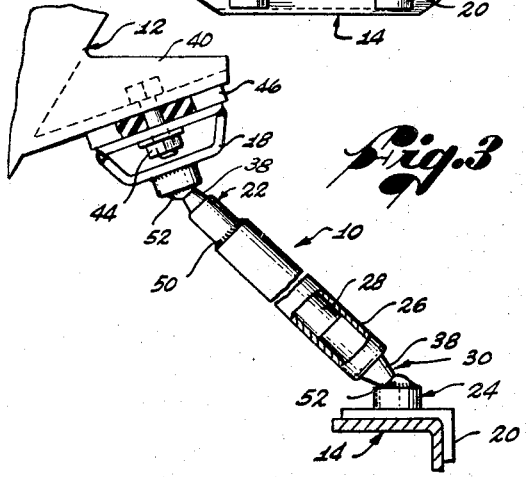
INVENTOR.
CLEM TE BOW
BY *Fulwider, Patton, Rieber
Lee, and Utecht*
ATTORNEYS United States Patent Office 3,353,771
Patented Nov. 21, 1967

3,353,771
UNIVERSAL ENGINE MOUNT AND METHOD OF MOUNTING ENGINE
Clem Te Bow, Panorama City, Calif., assignor to C-T Automotive, Inc., North Hollywood, Calif., a corporation of California
Filed Dec. 30, 1965, Ser. No. 517,772
4 Claims. (Cl. 248—3)

ABSTRACT OF THE DISCLOSURE

Mounts are provided between an engine and a frame which cooporate therewith in such a way that a rigid connection is established between brackets on the engine and on the frame. In one embodiment the mounts comprise a pair of elongated tubes telescopically connected, one being slidable within the other, each tube having a universal joint such as a ball and socket on one end thereof which joint is connected to a bracket. The construction is such that during installation of the mounts the brackets are movable on said universal joints and the tubes are extensible and retractable for position the engine brackets and the frame brackets at the locations on the engine and frame to which they are to be secured. Thereafter, the tubes and universal joints may be locked in position, providing a rigid connection between the respective engine frame brackets.

This invention relates to improved means for mounting an engine on a vehicle frame and to an improved method for accomplishing the same; more particularly, the invention relates to such means and method having universal application in converting a vehicle from one make and model of engine to another.

As is well known, there is virtually no standardization with respect to frame or engine design in the automobile industry. Accordingly, specially constructed mounts are required for each make of vehicle and, in many cases, for each model as well. In view of the large volume in the industry and the highly developed mass production techniques, this normally does not present a serious problem, provided an engine of a given make and model is mounted on a frame of the same make and model.

On the other hand, where it is desired to change make or model of engine, problems are encountered. In this connection, it will be appreciated that there are an extremely large number of engine-frame combinations. To provide for conversion between even currently popular makes and models requires mounts of numerous different designs, each constructed for the particular engine and frame for which it is intended. Assuming availability of the proper mount, which itself is a problem, the cost usually is high because of the relatively small market. In the event commercially produced mounts are unavailable, such that they would have to be fabricated for a single job, the costs are often prohibitive. In addition, adjusting the position of the engine relative to the frame to the desired extent is difficult, at best, with mounts currently available.

In view of the foregoing it is a primary object of this invention to provide improved means for mounting an engine on a vehicle frame and an improved method of accomplishing the same, such means and method being of universal application and readily adapted for converting a vehicle from one make and model of engine to another.

A further object is to provide means and a method of the type described, which are highly effective in affording a strong and durable connection of the engine to the frame.

Another object is to provide means and a method of the type described, further characterized by being highly economical from the standpoint of labor costs involved in mounting the engine.

It is still another object of the invention to provide such improved means and method which freely enable adjustment in all directions of the position of the engine relative to the frame prior to securing the engine finally in place.

A still further object of the invention is to provide such means capable of accomplishing all of the foregoing objects, yet which is simple in construction and economical to manufacture.

These and other objects, features and advantages of the invention will be better understood by referring to the following detailed description taken in conjunction with the accompanying drawing, in which:

FIGURE 1 is a perspective view of an engine assembly mounted on a frame with a mount constructed in accordance with the invention and by the method of the invention;

FIGURE 2 is a rear elevational view taken in the direction of the arrowed line 2 in FIGURE 1;

FIGURE 3 is a view on an enlarged scale, partly in side elevation and partly in section, illustrating one of the mounts shown in place of FIGURES 1 and 2; and FIGURE 4 is a vertical, medial section of the mount as it is furnished prior to installation, with certain parts being shown in elevation for added clarity.

Referring to the drawing, numeral 10 designates the mount of the invention. A plurality of such mounts 10 are illustrated in conjunction with a typical engine assembly 12, including an engine and a transmission, and a typical vehicle frame 14 in FIGURES 1 and 2. As may be seen in those figures, two such mounts are secured to the assembly 12 and to the frame 14, one on each side, adjacent the forward end of the assembly. Two such mounts are also provided adjacent the rearward end of the assembly, each being secured at one of its ends to the transmission case 16 at the rearward end of the engine assembly 12 and at its opposite end to the frame 14. In practice, just one mount is often used adjacent the rearward end of the engine assembly. Therefore, although two such mounts are shown adjacent the rearward end of the assembly in the drawing, it will be understood that this is not necessarily always the case.

Each mount 10 includes end mounting brackets 18 and 20, an elongatable-retractable sleeve assembly 22, and universal joints 24 connecting the ends of the assembly to the brackets. The various parts preferably are formed of a strong and durable metal, such as steel, suitably coated so as to resist corrosion.

The brackets 18 and 20 are shaped in such a manner as to facilitate attachment to an engine assembly and with a variety of different mounting brackets and having a variety of different shapes. In the illustrative case, the bracket 18 has a box-like configuration, while the bracket 20 is L-shaped.

The sleeve assembly 22 comprises a pair of elongated tubular members 26 and 28 telescopically connected to one another. The outer member 26 receives the inner member 28 in a close sliding fit, and the members are arranged so that their ends initially are freely movable toward and away from one another.

As may be seen in FIGURE 4, each of the universal joints 24 includes a ball element 30 and a block 32 formed with a ball-retaining socket 34. The ball element 30, in turn, includes a ball 36 receivable in the socket 34 and a projecting stem 38. The block 32 is peened over adjacent the entrance to the socket 34 to maintain the element 30 in assembly with it. In the present case the blocks 32 are secured to the brackets 18 and 20 and the ball elements 30 are secured to the members 26 and 28 of the sleeve assembly 22. For convenience of manufacture, the stems 38 of the elements 30 projects into and are tightly received within the ends of the members 26 and 28, and the blocks 32 are secured to the brackets 18 and 20, and the stems 38 are secured to their respective members 26 and 28 by welding.

The assembled mount 10 in the condition in which it is furnished, as in FIGURE 4, affords the end brackets 18 and 20 complete freedom of movement relative to one another. It is to be noted in this respect that the telescoping sleeve assembly 22 enables the brackets to move toward and away from one another in a generally vertical direction in FIGURE 4; lateral movement and tilting in all directions about a full 360° arc is provided for by the two universal joints 24. By virtue of this operational characteristic, the mount 10 of the invention has universal application. Thus, during installation of said mounts, said brackets are movable on said universal joints and said pair of tubes are extensible and retractable with relation to one another for positioning the engine brackets and the frame brackets at the locations on the engine and frame to which they are to be secured, said tubes may be locked, and said universal joints may be locked in position whereby a rigid connection is established between respective engine and frame brackets.

Mounting of the engine assembly 12 on the frame 14 with the plurality of the mounts 10 and in accordance with the method of the invention may be quickly and easily accomplished. As previously noted, four mounts are used in the case of the illustrative engine assembly 12 and frame 14. It is usually convenient in the mounting process, with the engine assembly remote from the frame, to first secure the mounting brackets 18 to the forward and rearward mounting brackets 40 and 42 on the engine assembly and the brackets 20 to the frame 14. This is readily accomplished by virtue of the mounts being readily separated into two pieces simply by sliding apart the members 26 and 28 of the sleeve assembly 22. The bracket 18 is then preferably detachably connected to the brackets 40 and 42, as by nut and bolt assemblies 44 (FIGURE 3). For the purpose of cushioning shocks and absorbing vibration, resilient, deformable pads 46 are interposed between the mating faces of the brackets 18 and 40 in the manner illustrated in FIGURE 3. The connection of the brackets 20 at the opposite end of the mounts to the frame 14 may be accomplished by any suitable means, as by the bolt and nut assemblies 48 illustrated in FIGURES 1 and 2.

Assuming the brackets 18 and 20 of the four mounts to have been suitably secured to the engine assembly 12 and frame 14, the assembly 12 is lifted into position over the frame 14 and the associated members 26 and 28 of each sleeve assembly 22 are again telescopically connected. Any desired adjustment of the position of the engine assembly 12 may then be carried out, the mounts 10 affording complete freedom of movement of the assembly 12 relative to the frame 14 at this stage. This constitutes a significant advantage of the present mount over most all mounts heretofore available.

Once the engine assembly 12 is positioned approximately as desired, particularly the rearward portion adjacent the transmission case 16, the rearward mounts (or mount) are normally locked in position. This may be accomplished by welding the members 26 and 28 of the sleeve assemblies 22 of the rearward mounts to one another, as at 50 in FIGURE 3. This step, of course, serves to prevent elongation and retraction of the sleeve assemblies. The universal joints are also locked as by welding the ball elements 30 to their blocks 32 as at 52.

With the forward mounts 10 still freely movable, precise final adjustment of the position of the forward portion of the engine assembly 12 is carried out. Following such final adjustment, the sleeve assemblies 22 and the universal joints 24 of the forward mounts are likewise locked, as by welding at 50 and 52, to complete installation. The load of the engine assembly is then supported on the frame 14 by the four mounts 10, each of which is then in a locked or rigid condition between respective frame and engine brackets. That is, the sleeve assemblies are locked against movement relative to one another and the universal joints are locked from movement with relation to said tubes, to said brackets, and to one another. Stated in another way, the method of the invention comprises the steps of inserting one tube into the other, adjusting the overall length of the two tubes to an extent that the brackets and sockets are adjacent locations on the engine and frame to which the brackets are to be secured, rotating the sockets and associated brackets so that the brackets are in place for securing the same, welding the two tubes and said balls and associated sockets together, and securing said brackets to said engine and said frame.

Regarding the locking of the sleeve assemblies 22 and universal joints 24, it is to be noted that the supporting framework afforded by the several mounts 10 would be rigid from a geometric standpoint even though considerably less than all of them were locked. By way of specific example, should the four sleeve assemblies and any one of the several universal joints 24 be locked, the framework would be rigid. Moreover, in a static condition, the load comprising the engine assembly 12 would be evenly distributed in the desired manner. However, in order that excessive loading of a single mount be avoided, as would otherwise be likely to occur during operation of the vehicle, it is desirable that at least one of the joints 24 of each mount, as well as each of the sleeve assemblies, be locked. Further, in order to enhance the strength of the supporting framework, it is preferable to lock all joints 24 and sleeve assemblies 22.

In view of the complete freedom of movement afforded by the individual mounts 10 prior to locking, it will be readily appreciated that the mount of the invention has universal application. Differences in configuration and in positioning of mounting brackets between one make or model of engine and another are accommodated by the telescoping sleeve assembly 22 and universal joints 24. Any desired adjustment of the position of the engine assembly 12 relative to the frame 14 may be quickly and easily accomplished by virtue of these same structural features.

While one embodiment of the mount of the invention and an illustrative method of mounting an engine assembly in accordance with the invention have been illustrated and described in detail, it will be understood that this is only by way of example and that the details of the constructions and arrangements of the various parts of the mount and that the steps of the method may be changed without departing from the spirit and scope of the invention, as defined by the appended claims.

I claim:

1. In combination with an engine and a supporting frame, means for mounting the engine on the frame including a plurality of spaced load-supporting mounts disposed, at least one each on opposite sides of the engine assembly, said mounts comprising:

first mounting brackets secured to said engine;

second mounting brackets secured to said frame;

elongated tubular sleeve assemblies, each including a pair of telescopically connected tubes and arranged for free elongation and retraction;

first universal joints connecting one of the ends of said sleeve assemblies to their associated first brackets;

second universal joints connecting the opposite ends of said sleeve assemblies to their associated second brackets;

whereby during installation of said mounts, said brackets are movable on said universal joints, and said pair of tubes are extensible and retractable for positioning the engine brackets and the frame brackets at the locations on the engine and frame to which they are secured, said tubes may be locked in position, and said universal joints may be locked in position;

means locking the members of each of said sleeve assemblies against movement relative to one another; and means locking said universal joints from movement with relation to said tubes, to said brackets, and to one another, whereby a rigid connection is established between respective engine and frame brackets.

2. The subject matter of claim 1, including shock-absorption means connected to said mounts.

3. The combination of claim 1 in which each universal joint comprises a ball secured immovably to one end of said tubular member, with the ball being secured into a socket, one socket being secured to said engine and the other socket being secured to said frame.

4. In a method of installing a mounting bracket for an automobile engine for securing the engine to an automobile frame, said bracket comprising a tube freely slidable into and out of another tube, each tube having fixedly secured to one end thereof a ball, each ball having a rotatable ball-retaining socket thereon, each socket being secured to a mounting bracket, the improvement comprising the steps of:

inserting one tube into the other;

adjusting the overall length of the two tubes to an extent that the brackets and sockets are adjacent locations on the engine and frame to which the brackets are to be secured;

rotating the sockets and associated brackets so that the brackets are in place for securing the same;

welding the two tubes together and said balls and associated sockets together; and securing said brackets to said engine and said frame.

References Cited
UNITED STATES PATENTS

| | | | |
|---|---|---|---|
| 2,083,277 | 6/1937 | Scott | 248—6 |
| 2,864,573 | 12/1958 | Olley et al. | 248—9 |
| 2,936,978 | 5/1960 | Lauck | 248—5 |

JOHN PETO, *Primary Examiner.*